(No Model.)
K. HAUSSNER.
VEHICLE WHEEL.
No. 486,106. Patented Nov. 15, 1892.
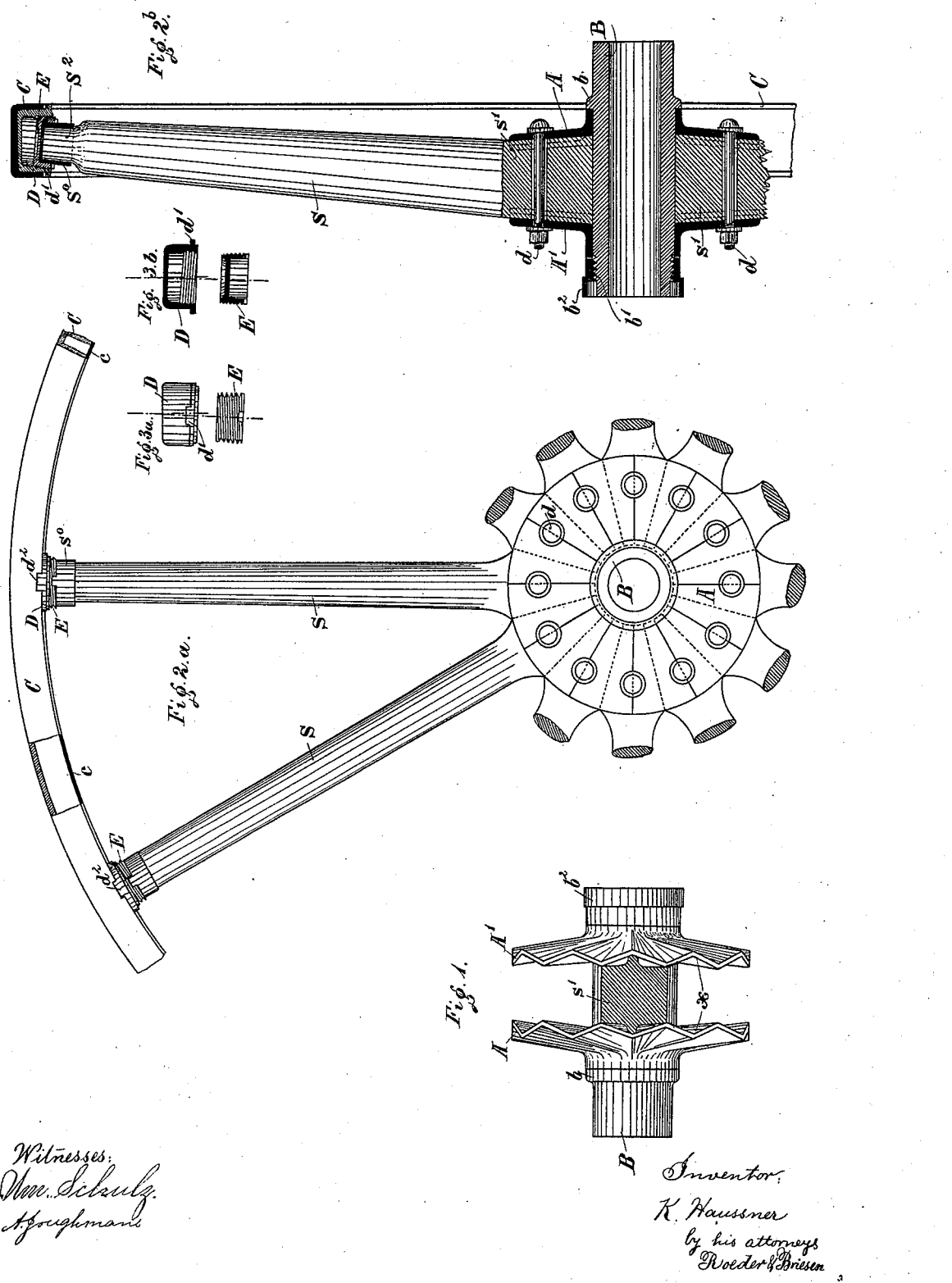
Witnesses:
Wm. Schulz
A. Foughman
Inventor:
K. Haussner
by his attorneys
Roeder & Briesen

UNITED STATES PATENT OFFICE.

KONRAD HAUSSNER, OF INGOLSTADT, GERMANY.

VEHICLE-WHEEL.

SPECIFICATION forming part of Letters Patent No. 486,106, dated November 15, 1892.

Application filed July 29, 1891. Serial No. 401,033. (No model.)

*To all whom it may concern:*

Be it known that I, KONRAD HAUSSNER, residing at Ingolstadt, Bavaria, Germany, have invented certain new and useful Improvements in Vehicle-Wheels, of which the following is a specification.

This invention relates to an improved wheel to be used more particularly for trucks and gun-carriages, though the wheel may be used for vehicles generally. My improved wheel is made light and strong and its spokes may be readily replaced.

The invention consists in the various features of improvement, more fully pointed out in the claims.

In the accompanying drawings, Figure 1 is a side elevation of the hub; Fig. $2^a$, a side elevation of part of the entire wheel; Fig. $2^b$, a transverse section through the same; Fig. $3^a$, a side view of nut D and cap E, and Fig. $3^b$, a section through the same.

The letters A A' represent a pair of annular fluted or corrugated disks of conical shape, so as to incline inwardly or diverge from their periphery toward their center and to form a series of adjacent sector-shaped spoke-mortises $x$ between them. The corrugations forming these mortises are of radial form and extend from center to periphery of each disk. To this particular shape of the disks I attach considerable importance, as by it their power to resist lateral pressure is greatly increased. The disks A A' are slipped over the tube B, having an offset $b$, against which the disk A abuts. The disk A' is held to the tube B by means of a nut $b^2$, engaging a thread $b'$ of the tube and bearing against the disk. The tenons $s'$ of the spokes $s$ are received by the mortises $x$ and are in contact with each other at their inner ends. By screwing up the nut $b^2$ they are tightly held in place. Near their periphery the disks A A' are connected by a series of screw-bolts $d$.

C is the tire of the wheel, made of U-shaped band iron or steel and protected on its inner or open side by sheet-metal covering-plates $c$. Within this tire there are received nuts D, having lugs $d'$, that engage notches $d^2$ in the tire-flange. These lugs $d'$ when engaging the notches prevent the nuts from turning. Each nut D receives a screw-cap E, that in turn receives a metal cap $s^\circ$, slipped over the outer spoke-tenon $s^2$. To replace a spoke, the bolts $d$ are removed, the nut $b^2$ taken off, and the disk A' drawn back. The cap E is now screwed into nut D and the tenon $s^2$, with its cap $s^\circ$, is introduced into the cap E, while the tenon $s'$ is introduced into its mortise $x$. The nut $b^2$ is then screwed up, the bolts $d$ are reintroduced, and the nut D is revolved until the proper degree of tension has been obtained.

What I claim is—

1. The combination of tube B with a pair of conical disks provided with radial corrugations to form a series of adjacent spoke-receiving mortises which widen from the center toward the periphery and with spokes within the mortises and in contact with each other at the center, substantially as specified.

2. The combination of U-shaped tire C with nuts D, received by the tire, and with caps E, received by such nuts, substantially as specified.

3. The combination of U-shaped notched tire C with the inner protecting-plates $c$ and with the nuts D, having lugs $d'$, and with caps E, received by such nuts, substantially as specified.

In testimony that I claim the foregoing as my invention I have signed my name in presence of two subscribing witnesses.

KONRAD HAUSSNER.

Witnesses:
 ALBERT WEICKMAR,
 H. NICKELL.